Figure 1:
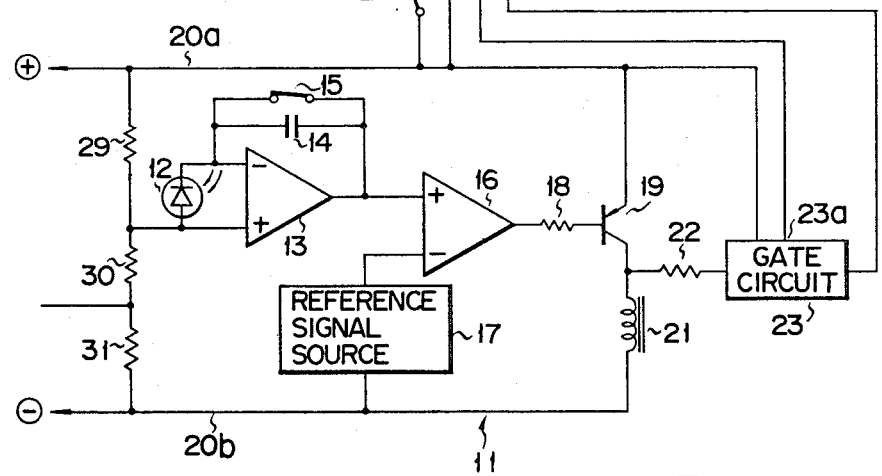

United States Patent [19]

Kondo et al.

[11] 4,358,187
[45] * Nov. 9, 1982

[54] AUTOMATIC-LIGHT CONTROL ELECTRONIC FLASH DEVICE FOR USE IN AUTOMATIC EXPOSURE CAMERA

[75] Inventors: Isao Kondo; Yukio Nakajima, both of Hachioji, Japan

[73] Assignee: Olympus Optical Co., Ltd., Tokyo, Japan

[*] Notice: The portion of the term of this patent subsequent to May 19, 1998, has been disclaimed.

[21] Appl. No.: 215,254

[22] Filed: Dec. 11, 1980

Related U.S. Application Data

[62] Division of Ser. No. 53,284, Jun. 29, 1979, Pat. No. 4,268,140.

[30] Foreign Application Priority Data

Jul. 6, 1978 [JP] Japan .................................. 53-82240

[51] Int. Cl.³ .............................................. G03B 15/05
[52] U.S. Cl. .......................................... 354/33; 354/34
[58] Field of Search ................... 354/32, 33, 34, 60 F, 354/145

[56] References Cited

U.S. PATENT DOCUMENTS

| | | | |
|---|---|---|---|
| 4,023,187 | 5/1977 | Shenk | 354/34 X |
| 4,079,389 | 5/1978 | Hashimoto et al. | 354/60 F X |
| 4,268,140 | 5/1981 | Kondo et al. | 354/60 F X |

Primary Examiner—Michael L. Gellner

[57] ABSTRACT

An automatic-light control electronic flash device used in automatic exposure camera having a gate circuit connected between an electromagnetic device for driving a shutter rear curtain and a light control signal output terminal. The gate circuit is enabled by a flash ready signal produced from the automatic-light control electronic flash device thereby to permit a light control signal producing in response to the deenergization of the electromagnetic device to pass therethrough to the automatic-light control electronic flash device.

4 Claims, 3 Drawing Figures

AUTOMATIC-LIGHT CONTROL ELECTRONIC FLASH DEVICE FOR USE IN AUTOMATIC EXPOSURE CAMERA

This is a division of application Ser. No. 053,284, filed June 29, 1979, now U.S. Pat. No. 4,268,140.

The invention raltes to an automatic-light control electronic flash device shutter for automatic exposure camera.

In an aperture-priority automatic exposure camera or an electrically-controlled shutter circuit, a circuit for setting shutter speed in accordance with an amount of light incident onto the camera provides a signal to control a switching transistor connected to an electromagnetic coil. The electromagnetic coil is energized or deenergized in response to the ON or OFF operation of the transistor. The electromagnetic coil is provided in a shutter mechanism and closes a shutter when it is deenergized. Recently, an automatic exposure camera has been developed and practically used in which an automatic-light control electronic flash device, i.e. an autostrobo device, is automatically light-controlled by using a counter electromotive force produced in the electromagnetic coil at the time of deenergization of the electromagnetic coil. In this type camera, a synchronizing contact, i.e. a T contact, to supply the counter electromotive force from the electromagnetic coil to the electronic flash device is connected to the electromagnetic coil directly or by way of a resistor. With this connection, when the camera is connected to the automatic light control electronic flash device by way of the synchronizing contact or when the T contact is shortcircuited to ground or a G contact, a negative charge flows into the electomagnetic coil through an internal circuit of the electronic flash device or the G contact and the T contact. Due to this the deenergization of the electromagnetic coil is delayed, thus resulting in a delay of the closing of the shutter.

Accordingly, an object of the invention is to provide an automatic-light control electronic flash device for automatic exposure camera of which the shutter speed is not influenced by an external connective condition of the synchronizing contacts of the camera.

According to the invention, there is provided an automatic light control electronic flash device comprising a main capacitor, a flash tube connected to the main capacitor, a light control circuit for controlling the termination of the flashing and means for applying a gate signal to a gate circuit provided in the camera. The light control circuit terminates the flashing of the flash tube in response to the light control signal from the light control signal producing means of the camera through the gate circuit.

Figure 3:
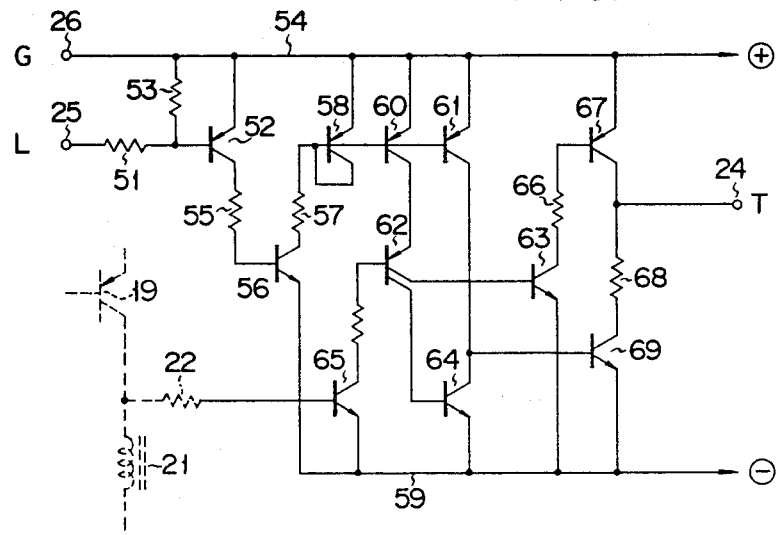
Figure 2:
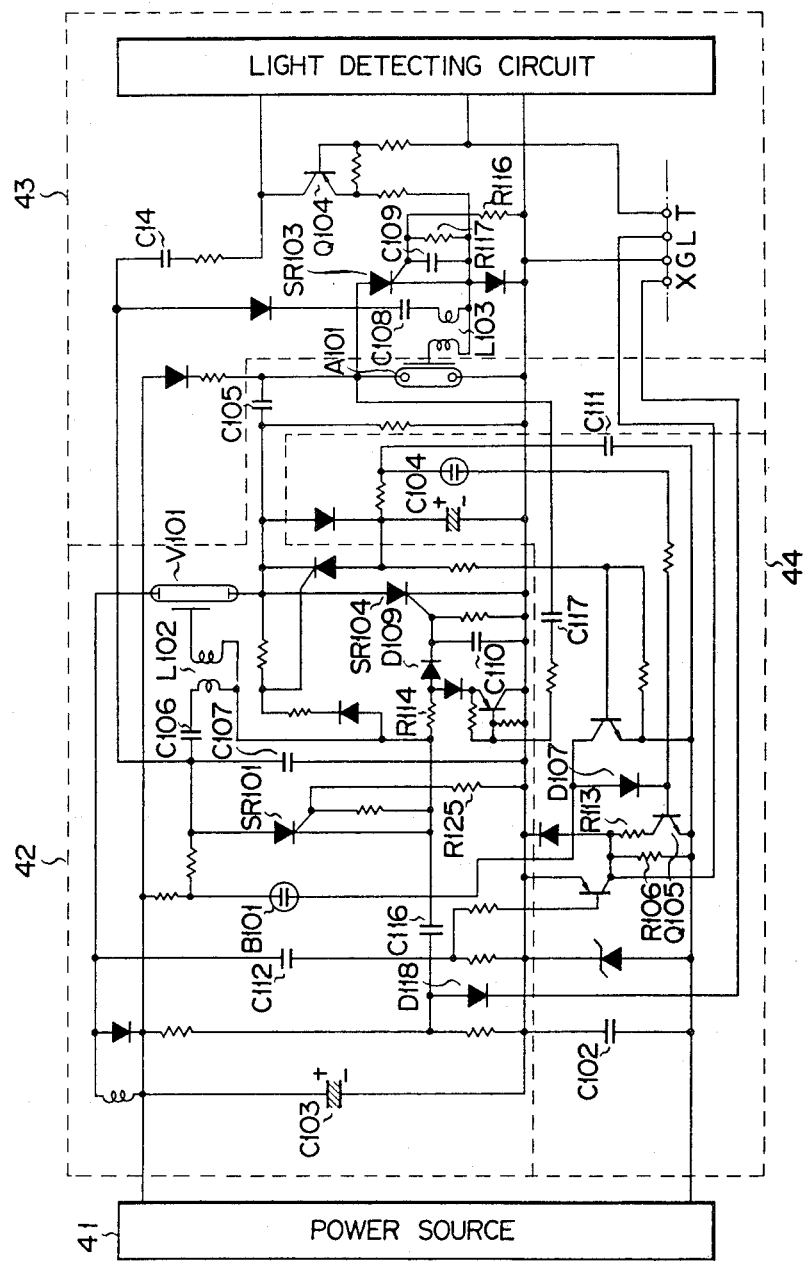

Other objects and features of the invention will be apparent from the following description taken in connection with the accompanying drawings, FIG. 1 shows a circuit diagram of an electrically-controlled shutter circuit for automatic exposure camera which is an embodiment according to the invention;

FIG. 2 shows a circuit diagram of an automatic-light control electronic flash device connected to a camera having the shutter circuit shown in FIG. 1; and FIG. 3 shows a circuit diagram of a gate circuit included in the shutter circuit shown in FIG. 1.

As shown in FIG. 1, the cathode and anode of a light sensing element 12, such as a silicon photodiode, respectively, are connected to the inverted and the non-inverted input terminals of an operational amplifier 13 in an electrically-controlled shutter circuit 11 for an automatic exposure camera. A parallel circuit having a capacitor 14 and a switch 15 is coupled between the inverted input terminal and the output terminal of the amplifier 13. The light receiving element 12, the operational amplifier 13 and the capacitor 14 cooperate to form an integrating circuit. The switch 15 is opened in synchronism with the release of the shutter of a camera. The output terminal of the operational amplifier 13 is connected to the non-inverted input terminal of an operational amplifier 16. The operational amplifier 16 is connected at the inverted input terminal to a reference voltage source 17 and at the output terminal to the base of a PNP transistor 19 through a resistor 18. The emitter of the transistor is connected to a positive line 20a. The collector of the same transistor is connected to a negative line 20b through an electromagnetic coil 21. The electromagnetic coil 21 is provided to drive a shutter rear curtain (not shown) of the camera. The connecting point between the electromagnetic coil 21 and the collector of the transistor 19 is connected to a T terminal 24 through a resistor 22 and a gate circuit 23. A control signal input terminal 23a of the gate circuit 23 is connected to an L contact 25. A G contact 26 is connected to a positive line 20a and an X contact 27 is connected to the positive line 20a through a switch 28. Inserted between the positive and negative lines 20a and 20b is a series circuit including resistors 29, 30 and 31. The connection point between the resistors 29 and 30 in the series circuit is connected to the anode of the photodiode 12.

The synchronizing contracts of the camera, that is, the T, L, G, and X contacts 24 to 27, are connected to the corresponding T, L, G, and X terminals of the electronic flash device 40, respectively. As shown in FIG. 2, the electronic flash device 40 is comprised of a power source circuit 41, a light emission circuit 42, a control circuit 43 and a display circuit 44. The control circuit 43 includes a light detecting circuit having a light sensing element (not shown). When a power switch (not shown) is turned on, a main capacitor C103 and other capacitors C102, C105 to C108, C112, C114, C116, C117 and the like are charged. When the main capacitor C103 is charged to a given voltage, a neon discharge lamp B101 glows to be ready for the flashing operation of the flash device. Upon the glow of the neon discharge lamp B101, a transistor Q105 is turned on. When the transistor Q105 is in an OFF state, a relatively small current is fed to the L terminal via a resistor R106. In an ON state of the transistor Q105, a large current is fed thereto through parallel-connected resistors R106 and R113. In other words, the current level fed to the L contact depends on the operating state (ON or OFF) of the transistor Q105. When the current supplied to the L terminal on the flash device goes through the L contact 25 of the camera to reach the gate circuit 23 in the electrically-controlled shutter circuit 11, the gate circuit 23 is enabled to connect the T contact 24 to the electromagnetic coil 21 therethrough. Under this condition, if a release button (not shown) of the camera is depressed, and the X and G synchronizing contacts 27 and 26 are shortcircuited each other, a capacitor C116 in the light emission circuit 42 is discharged through a route of diode D118—X, G contacts—resistor R125—gate-cathod path of the thyristor SR101. As a result, the thyristor SR101 is conductive and the capacitor C106 is discharged through the thyristor SR101 and the primary winding of a pulse transformer L102. The discharge current from the capacitor C106 induces a trigger voltage in the secondary winding of the pulse transformer L102. The trigger voltage is applied to the trigger electrode of a flash discharge tube V101. At this time, the capacitor 107 discharges through a route of thyristor SR101—resistor R114—diode D109—gate-cathode path of a main thyristor SR104. The result is the conduction of the main thyristor SR104. Therefore, the charging voltage across the main capacitor C103 drives the flash discharge tube V101 to flash. When the light sensing element 12 receives the flash light of the electronic flash device 40 (and exterior light), the operational amplifier 13 produces an integrating output signal corresponding to an amount of light. The integrating output signal from the operational amplifier 13, together with a reference signal from the reference signal source 17, is applied to an operational amplifier 16. The operational amplifier 16 compares the levels of both signals, that is, the integrating output voltage and the reference voltage, and when the output signal of the amplifier 13 reaches a given level, the output level of the amplifier 16 is inverted so that the transistor 19 is turned on. As a result, the electromagnetic coil 21 is deenergized to drive the rear curtain (not shown) of the shutter, for example. At an instance that the electromagnetic coil 21 is deenergized, a counter electromotive force is produced in the electromagnetic coil 21 and is applied to the gate of the transistor Q104 of the control circuit 43 in the electronic flash device 40 through the gate circuit 23 and the T terminal 24. As a result, the transistor Q104 is conductive to permit a gate current to be fed to the gate of the thyristor SR103. Upon the conduction of the thyristor SR103, the discharge current of the capacitor C108 flows through the primary winding of the pulse transformer L103 and a trigger pulse signal is applied to the trigger electrode of an arrestor 101 to fire the arrestor. As a result, the capacitor C105 provides an inverse voltage to the main thyristor SR104, through the arrestor 101, thereby to cut off the main thyristor.

As described above, when the electronic flash device 40 is used to synchronize in operation with the camera, the X and G synchronizing contacts are shortcircuited in response to the operation of the release button of the camera. The shortcircuiting of those contacts causes the flash discharge tube to start its flashing operation. In response to a proper amount of the incident light, the electromagnetic coil 21 is deenergized to induce an inverse voltage in the electromagnetic coil 21 and the inverse voltage induced stops the flashing operation of the electronic flash device 40. In an automatic exposure camera used with the electronic flash device in a synchronizing relation, the electronic flash device and the camera are connected through the synchronizing contacts. When the power source of the electronic flash device 40 is turned off, and the electronic flash device 40 is in an non-operative condition, the transistor Q105 in the display circuit 44 shown in FIG. 2 is not in an ON condition so that a signal to enable the gate circuit 23 in the electrically-controlled shutter circuit 11 is not supplied to the L contact. Therefore, the gate circuit 23 is kept in a disabling condition and hence the gate circuit 23 is not connected to the electromagnetic coil 21. Accordingly, under this condition, when the G and T contacts are connected through the internal cirucit of the electronic flash device 40, the electromagnetic coil 21 is not electrically connected to the electronic flash device 40. For this, no current flows into the electromagnetic coil 21, through the G and T contacts and the internal circuit of the electronic flash device, with result that no delay of the deenergization of the electromagnetic coil occurs. Such a deenergization delay of the electromagnetic coil is remarkable in a high speed photographing operation. However, the electrically-controlled shutter according to the invention successfully eliminates the deenergization delay. When the electronic flash device is operated, the gate circuit 23 is enabled, a current path is formed continuous to the electromagnetic coil 21 via the internal circuit of the electronic flash device. In this case, however, the shutter speed is relatively slow and therefore the current flowing through the current path formed little influences the shutter speed.

While the above description has been made relating to a case that the flash discharge device in the inoperative condition is coupled with an automatic exposure camera, there is a case that, when a camera is not coupled with the flash discharge device, the synchronizing contacts, i.e. the G and T contacts, are shortcircuited for some reason. IN such a case, however, since the L contact is open as above described, no ON signal is applied to the gate circuit 23 never to enable the gate circuit 23. Therefore, even if the G and T contacts are shortcircuited, no current path connected from the flash device to the elecromagnetic coil 21 is formed so that no delay of the shutter closing operation takes place.

Any circuit construction is permitted for the gate circuit 23 used in the electrically-controlled shutter circuit, if it can effect the above-mentioned operation. A typical example of the gate circuit 23 is shown in FIG. 3. As shown, the T contact 25 is connected to the base of an NPN transistor 52 via a resistor 51. The base of the transistor 52 is connected to a positive line 54 through a resistor 53. The positive line 54 is connected to the base of a PNP transistor 56 through the emitter-collector path of the transistor 52 and a resistor 55. The collector of the transistor 56 is connected to the base and the collector of a transistor 58, via a resistor 57. The emitter of the transistor 56 is connected to a negative line 59. The emitter of the transistor 58 is connected to the positive line 54. The bases of PNP transistors 60 and 61 are connected to the collector of the transistor 57 via the resistor 57. The emitter of a multi-collector type PNP transistor 62 is connected to the positive line 54 through the collector-emitter path of the transistor 62. The first collector of the transistor 62 is connected to the base of an NPN transistor 63 and the second collector thereof to the base of an NPN transistor 64. The base of the transistor 62 is connected to the negative line 59 through the collector-emitter path of the NPN transistor 65. The base of a transistor 65 is connected through a resistor 22 to an electromagnetic coil 21. The collector of the transistor 63 is connected to the base of a PNP transistor 67 and the emitter thereof is connected to the negative line 59. The emitter of the transistor 67 is connected to the positive line and the collector thereof is connected to the negative line via the collector-emitter path of an NPN transistor 69. The collector of the transistor 67 is coupled with the T contact.

In operation, when a negative voltage is applied from a flash discharge device 40 to the gate circuit shown in FIG. 3 through the L terminal 25, the transistor 52 is conductive and then the transistor 56 is made conductive. As a result, the transistors 58, 60 and 61 conduct. At this time, a positive voltage has been applied to the base of the transistor 65. For this, the transistor 62 is conductive and therefore the transistors 63 and 64 also conduct. Accordingly, the transistor 67 is conductive while the transistor 69 is non-conductive, and a positive voltage is applied to the T contact 24. Under this condition, when the transistor 19 is non-conductive, the transistor 65 becomes non-conductive and the transistor 67 becomes non-conductive. Further, the transistor 69 conducts so that a negative voltage is applied to the contact 24. The negative voltage applied serves as a light control signal to render conductive the transistor Q104 (FIG. 2) in the control circuit 43 of the flash discharge device 40.

As described above, in the present invention, a gate circuit is provided between the electromagnetic coil in the electrically-controlled shutter circuit for the automatic exposure camera and the synchronizing contact for the light control signal. The gate circuit is enabled by a flash-ready signal produced from the flash discharge device. With such a unique construction, the automatic exposure camera is operable free from no deenergization delay of the electromagnetic coil, that is no delay of the closing of the shutter.

What we claim is:

1. An automatic light control electronic flash device for use in automatic exposure camera including a shutter speed set circuit for setting a shutter speed in accordance with an amount of light incident onto a camera to produce a shutter control signal, said shutter speed set circuit including an integrating circuit having a light sensing element for receiving the light incident onto a camera when a shutter is actuated to produce an integrated output signal in accordance with the amount of the incident light, and a comparing circuit for comparing the integrated output signal produced from said integrating circuit with a reference signal, a switching circuit operating in response to a shutter control signal produced by said shutter speed set circuit, an electromagnetic device which is connected to said switching circuit to operate in response to the operation of said switching circuit to drive a shutter mechanism, light control signal producing means for producing a light control signal in response to the shutter control signal, a gate circuit having an input terminal connected to said light control signal producing means and an output terminal, said automatic light control electronic flash device comprising a main capacitor, a flash tube connected to said main capacitor, means for applying a gate signal to said gate circuit of said camera to open said gate, means for flashing said flash tube in response to a trigger signal, and a light control circuit connected to the output terminal of said gate circuit for terminating the flashing of said flash tube in response to the light control signal from said light control signal producing means through said gate circuit.

2. An automatic light control electronic flash device according to claim 1, which includes means for displaying a ready condition for flashing said flash tube.

3. An automatic light control electronic flash device according to claim 1, wherein said means for flashing said flash tube comprises a main thyristor connected in series to said flash tube and triggered by the trigger signal produced in response to a release operation of said camera and means for applying a trigger signal to a trigger electrode of said flash tube.

4. An automatic light control electronic flash device according to claim 3, wherein said light control circuit comprises means for generating a trigger signal in response to the control signal, an arrestor fired by the trigger signal and means for applying an inverse voltage to said main thyristor through said arrestor to turn off said main thyristor.

* * * * *